United States Patent
Chen et al.

(10) Patent No.: US 12,538,220 B2
(45) Date of Patent: Jan. 27, 2026

(54) BUSINESS REQUEST PROCESSING METHOD AND SYSTEM, ELECTRONIC DEVICE, AND COMPUTER STORAGE MEDIUM

(71) Applicant: TENCENT TECHNOLOGY (SHENZHEN) COMPANY LIMITED, Guangdong (CN)

(72) Inventors: Wei Chen, Shenzhen (CN); Yachen Wang, Shenzhen (CN); Jiaxin Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 517 days.

(21) Appl. No.: 18/059,271

(22) Filed: Nov. 28, 2022

(65) Prior Publication Data

US 2023/0089325 A1    Mar. 23, 2023

Related U.S. Application Data

(63) Continuation of application No. PCT/CN2021/124941, filed on Oct. 20, 2021.

(30) Foreign Application Priority Data

Dec. 2, 2020    (CN) .......................... 202011401473.4

(51) Int. Cl.
*H04W 48/18* (2009.01)
*H04W 28/16* (2009.01)
*H04W 48/02* (2009.01)

(52) U.S. Cl.
CPC ........... *H04W 48/18* (2013.01); *H04W 28/16* (2013.01); *H04W 48/02* (2013.01)

(58) Field of Classification Search
CPC ..... H04W 48/18; H04W 28/16; H04W 48/02; H04L 41/0893; H04L 67/60
USPC ....................................................... 455/422.1
See application file for complete search history.

(56) References Cited

U.S. PATENT DOCUMENTS

2019/0223093 A1*    7/2019    Watfa ................... H04W 36/13

FOREIGN PATENT DOCUMENTS

| CN | 110213780 A | 9/2019 |
|----|-------------|--------|
| CN | 110708734 A | 1/2020 |
| CN | 112600693 A | 4/2021 |
| WO | 2018/045877 A1 | 3/2018 |

OTHER PUBLICATIONS

International Search Report for PCT/CN2021/124941 dated Dec. 15, 2021.

* cited by examiner

*Primary Examiner* — Huy C Ho
(74) *Attorney, Agent, or Firm* — Sughrue Mion, PLLC

(57) ABSTRACT

A request processing method includes: determining, based on a request of a terminal, first network slice information of a current network slice accessed by the terminal, and acquiring second network slice information respectively corresponding to at least one subscribed network slice, the subscribed network slice being a network slice allowing access of the terminal; and determining whether there is a detection result of target second network slice information satisfying an access condition in the respective second network slice information, and controlling the current network slice based on the detection result.

20 Claims, 6 Drawing Sheets

BUSINESS REQUEST PROCESSING METHOD AND SYSTEM, ELECTRONIC DEVICE, AND COMPUTER STORAGE MEDIUM

CROSS-REFERENCE TO RELATED APPLICATION(S)

This application is a continuation application of International Application No. PCT/CN2021/124941, filed on Oct. 20, 2021, which claims priority to Chinese Patent Application No. 202011401473.4, filed with the China National Intellectual Property Administration on Dec. 2, 2020, the disclosures of which are incorporated by reference in their entireties.

FIELD

The disclosure relates to the field of communication technologies, and in particular, to a business request processing method and system, an electronic device, and a computer-readable storage medium.

BACKGROUND

Network slicing is a key technology in 5G (5th generation mobile networks or 5th generation wireless systems or 5th-Generation) network system. Network slicing builds a plurality of isolated virtual networks on a physical network through technologies such as software defined network/ network function virtualization, and constitutes a plurality of independent network slices, so as to realize network function and performance customization for end-to-end logical private network services.

At present, a control and management mechanism of 5G network slicing, a network slicing mechanism used by industry customers and a user/business access method are defined in the conventional technology. However, there is a lack of network slice management and control methods.

SUMMARY

The disclosure provides a business request processing method and system, an electronic device, and a computer-readable storage medium. The technical solutions are as follows:

In one aspect, some embodiments may provide a business request processing method, performed by a slice controller. The method includes: determining, based on a business request of a terminal, a current network slice accessed by the terminal, and acquiring second network slice information respectively corresponding to at least one subscribed network slice, the subscribed network slice being a subscribed network slice allowing access of the terminal; and determining whether there is a detection result of target second network slice information satisfying an access condition in the respective second network slice information, and controlling the current network slice based on the detection result.

In another aspect, some embodiments may provide a business request processing system. The system includes: a business server, configured to acquire a business request of a terminal and transmit the business request of the terminal to a slice controller; at least one memory configured to store program code; and at least one processor configured to read the program code and operate as instructed by the program code to: determine, based on the business request of the terminal, a current network slice accessed by the terminal, and acquire second network slice information respectively corresponding to at least one subscribed network slice, the subscribed network slice being a network slice allowing access of the terminal; and determine whether there is a detection result of target second network slice information satisfying an access condition in the respective second network slice information, and control the current network slice based on the detection result.

According to another aspect, some embodiments may provide an electronic device, including: a processor and a memory, and a bus; the bus being configured to connect the memory and the processor, the memory being configured to store operation instructions, and the processor being configured to perform the operation instructions, to cause the electronic device to perform the operations corresponding to the foregoing business request processing method.

According to another aspect, some embodiments may provide a computer-readable storage medium, storing a computer program, the program, when executed by a processor, implementing the foregoing business request processing method.

According to another aspect, a computer program product of some embodiments includes a computer program, and the computer program, when executed by a processor, implements the operations according to the foregoing method embodiment.

Details of one or more embodiments are provided in the accompanying drawings and descriptions below. Other features, objectives, and advantages of the disclosure are illustrated in the specification, the accompanying drawings, and the claims.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

A person skilled in the art may understand that, the singular forms "a", "an", "said", and "the" used herein may include the plural forms as well, unless the context clearly indicates otherwise. It is to be further understood that, the terms "include" and/or "comprise" used in this specification refer to the presence of stated features, integers, operations, operations, elements, and/or components, but do not preclude the presence or addition of one or more other features, integers, operations, operations, elements, components, and/or combinations thereof. It is to be understood that, when an element is "connected" or "coupled" to another element, the element may be directly connected to or coupled to the another element, or an intermediate element may exist. In addition, the "connection" or "coupling" used herein may include a wireless connection or a wireless coupling. The term "and/or" used herein includes all of or any of units and all combinations of one or more related listed items.

In the following descriptions, related "some embodiments" describe a subset of all possible embodiments. However, it may be understood that the "some embodiments" may be the same subset or different subsets of all the possible embodiments, and may be combined with each other without conflicts.

The business request processing method and system, the electronic device, and the computer-readable storage medium provided in the disclosure are meant to resolve the foregoing technical problems in the related art.

The following describes the technical solutions of the disclosure and how to resolve the foregoing technical problems according to the technical solutions of the disclosure in detail by using specific embodiments. The following embodiments may be combined to each other. The following describes some embodiments with reference to accompanying drawings.

Figure 1:
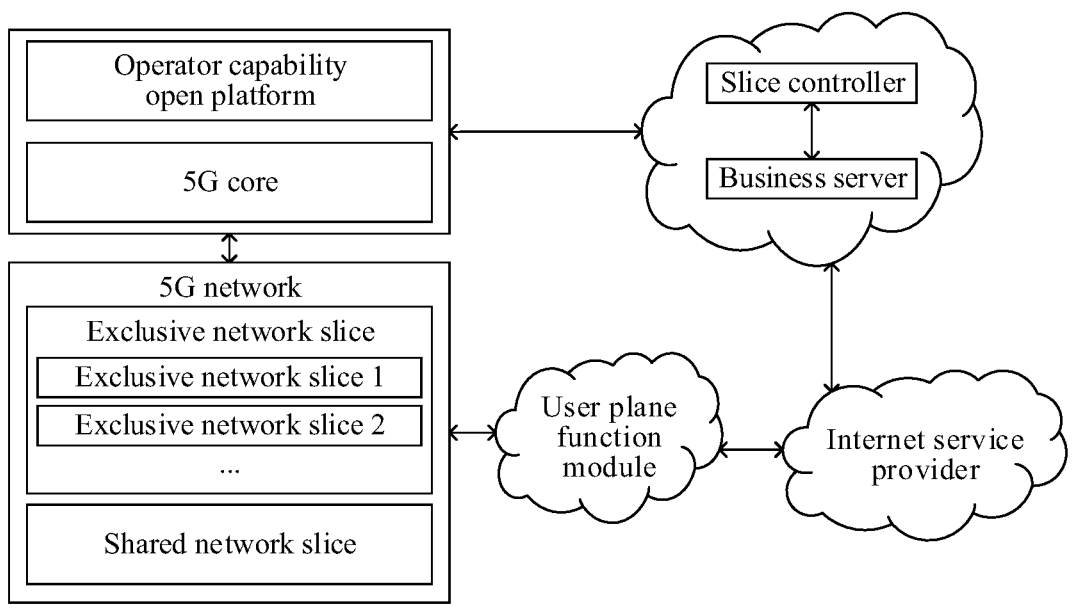
FIG. 1 is a schematic diagram of an application scenario of a business request processing method according to some embodiments.

The embodiments of the disclosure provide an application scenario of a business request processing method. FIG. 1 is a schematic diagram of an application scenario of a business request processing method according to some embodiments. Referring to FIG. 1, the application scenario includes:

Slice controller: mainly including three functions: 1) user/business priority management: the slice controller opens an interface for a business server so as to perform user and business priority configuration accessed in a network slice, and a user/business priority management function is used for maintaining priorities of different businesses and users; 2) slice capacity management: a slice capacity management function is used for trying to connect an operator network to expand a network slice resource under the preemption of internal long-time slice resources in a specified network slice under a certain cell/base station; 3) user management: a user management function is used for guaranteeing the network quality of high-priority users or businesses in an exclusive network slice by managing users in a network slice under a specified cell/base station to switch out an exclusive network slice to a shared network slice according to priorities.

Business server: providing business services to users and submitting/modifying/deleting business service priorities, user information using the business, user priorities, etc. to the slice controller through the interface provided by the slice controller according to policy information.

It is to be noted that for the convenience of understanding, this application deploys the business server and the slice controller in the same cloud, or integrates the slice controller within the business server. In practical applications, the business server and the slice controller may also be separately deployed in different clouds and may be adjusted according to practical requirements. This is not limited herein.

Application client: installed in a terminal used by a user for detecting the network quality of the terminal accessing a mobile network, including, but not limited to, delay and bandwidth, while maintaining a network quality threshold, and initiating a business request for improving the network quality to the business server when it is detected that the network quality does not meet the network quality threshold. The business request may include, but is not limited to, a network quality reduction alarm or a network acceleration request. For example, when the bandwidth of a terminal accessing a specified business is lower than a bandwidth threshold or the delay exceeds a delay threshold, the application client may initiate a quality reduction alarm or a network acceleration request to the business server.

Further, the network slice management system communicates with an operator capability open platform. The operator capability open platform supports reporting of specified network slice information, subscription of network slices, modification/expansion of network slices, and management of access/exit of users/businesses in/from network slices.

The network slice management system may also be referred to as a "processing system for business requests", which are substantially the same.

The operator capability open platform may be deployed in the same cloud or in different clouds with a 5G core (5GC). The operator capability open platform achieves slice subscription and user subscription, etc. by interfacing with the 5GC, and issues policy information to a specified user plane function (UPF) through a policy control function (PCF), a session management function (SMF) and other functions in the 5GC. The policy information may include predefined rules, a service data flow (SDF) filter, an application (APP) ID, and a corresponding forwarding rule, etc. The UPF communicates with the business server via an Internet service provider (ISP) network.

It is to be noted that, original functions of the 5GC, the UPF and the ISP are sufficient.

The operator capability open platform also communicates with a base station. A mobile network, such as a 5G network, is deployed in the base station. The base station performs corresponding processing on a network slice in the mobile network based on relevant instructions of the operator capability open platform. For example, the slice manager initiates a network slice switching request to the operator capability open platform, the operator capability open platform transmits a switching instruction to the base station, and the base station switches the network slice in the mobile network based on the switching instruction.

The mobile network includes two types of network slices: exclusive network slices and shared network slices. The network quality of the exclusive network slices will be higher than the network quality of the shared network slices, and the exclusive network slices and the shared network slices are allocated based on policy information, i.e. allocated based on priorities of users and businesses. The specific implementation will be described in detail hereinafter.

Further, the business server and the slice controller are also respectively provided with data interfaces, specifically including:

Data interface 1: a data interface between the slice controller and the business server, mainly used for realizing that the business server reports a business/user access network slice request, business/user priority information, and a network quality exception notification to the slice controller.

Data interface 1 includes two sub-interfaces: sub-interface 1 and sub-interface 2.

Sub-interface 1 is used for reporting relevant information of a user/business access network slice, and the relevant information includes but is not limited to: business/user priority, user/business information, position information, and IP triplets. The user information includes but is not limited to: a user private network Internet protocol (IP) address and a public network IP address, a mobile subscriber international integrated services digital network/public switched telephone network (ISDN/PSTN) number (MSISDN), an international mobile subscriber identity (IMSI), a generic public subscription identifier (GPSI), and a subscription permanent identifier (SUPI). The business information includes but is not limited to: an application identifier and a uniform resource locator (URL). The IP triplets include: a protocol, a local address and a local port number. The position information includes but is not limited to: a cell identifier of a cell where a terminal of a user is located, and positioning information of a global positioning system (GPS).

Sub-interface 2 is used for the business server to initiate a network quality reduction alarm or a network acceleration request to the slice controller via the interface when the network quality of a business on a user terminal side is reduced. The network quality reduction alarm and the network acceleration request may include, but are not limited to, the above relevant information.

A plurality of users may access the same business, and the priority of each user may be different. For example, five users access an online video business. Users 1 and 2 are ordinary users, and users 3, 4 and 5 are member users. User 3 is a level-1 member, user 4 is a level-5 member, and user 5 is a level-3 member. Then the priorities of users 1-5 from high to low are: User4>User5>User3>User1=User2.

Also, the priorities of different businesses may be different. It is assumed that the priority of an online conference business is higher than the priority of the online video business. In the above example, users 6 and 7 access the online conference business, and then the priorities of users 1-7 from high to low are: User6=User7>User4>User5>User3>User1=User2.

Data interfaces 2-4 are interfaces between the slice controller and the operator capability open platform. The slice controller is configured to manage a network slice under a specified cell/base station and an interface and interface information of a user.

Data interface 2: used for realizing an exclusive network slice expansion request. The slice controller initiates a network slice expansion request to the operator capability open platform via the interface. The main interface information includes a network slice identifier (such as single network slice selection assistance information (S-NSSAI) or an identity document (ID) provided by an operator to a user for identifying a network slice), position information (such as a cell ID or a transmitter address (TA) or GPS information), extended resource information (such as wireless bandwidth resources), etc.

Data interface 3: used for exclusive network slice user management. The slice controller may realize dynamic configuration of access/switch-out users in a network slice in a resource preemption environment through the interface. The main interface information includes network slice identifiers, user information, switch-in/switch-out flags, etc.

Data interface 4: a network slice state query interface, including two sub-interfaces.

Sub-interface 1 is used for querying the occupied amount/surplus of a specified exclusive network slice resource under a specified cell. The slice controller provides information, such as a network slice identifier and position information, through the interface. The operator capability open platform returns corresponding network slice information to the slice controller according to the information. The network slice information includes but is not limited to: a current resource usage amount of a network slice, a current resource remaining amount of a network slice, whether a network slice is currently in a normal state, a current terminal access amount of a network slice, and a network slice identifier.

Sub-interface 2 is used for querying a user accessing a specified exclusive network slice and user state information in a specified cell. The slice controller provides a network slice identifier, position information, etc. through the interface to acquire user state information returned by a mobile network in the specified cell. The user state information includes but is not limited to: the number of access users, access user information and the amount of resources used by users.

Data interface 5: an interface between an application client on a user terminal and a business server. When the network quality of the user terminal is reduced, the application client reports current terminal state information and user information to the business server through the interface. The terminal state information includes but is not limited to: terminal information, business information and position information of the terminal.

Further, the terminal needs to access the mobile network before transmitting a business request for improving network quality. In practical applications, under the condition of accessing a mobile network, when the start of the terminal is completed (for example, the startup of the terminal is completed), the terminal will automatically access the mobile network and may access a default network slice based on default access configuration information. The default access configuration information is used for randomly allocating a network slice for the terminal accessing the mobile network (the allocated network slice may be a subscribed network slice or may not be a subscribed network slice). In this way, the access of the terminal to the mobile network is completed.

Figure 2:
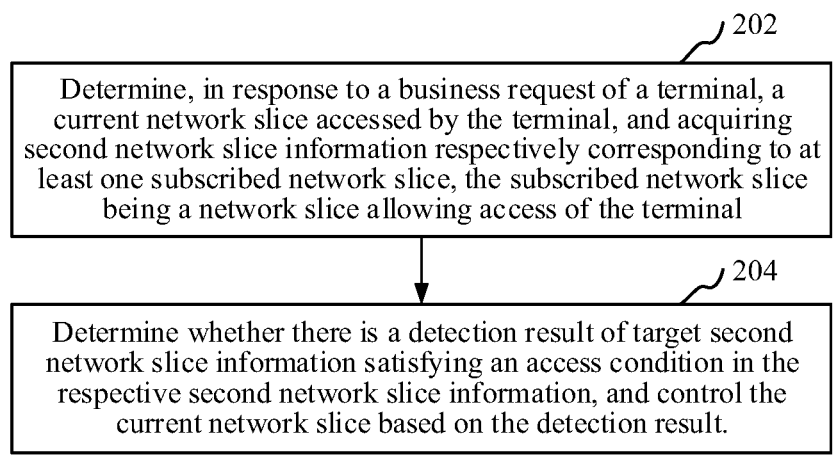
FIG. 2 is a schematic flowchart of a business request processing method according to some embodiments.

In some embodiments, a business request processing method is provided. As shown in FIG. 2, the method is applied to a slice controller. The method may include the following operations:

S201. Determine, based on a business request of a terminal, a current network slice accessed by the terminal, and acquire second network slice information respectively corresponding to at least one subscribed network slice. The subscribed network slice is a network slice allowing access of the terminal.

When the access of the terminal to the mobile network is completed, the terminal may communicate with the base station through the mobile network. In the process of communication, the application client in the terminal may detect the network quality of the mobile network accessed by the terminal in real time, including, but not limited to, delay and bandwidth. When it is detected that the network quality does not meet a network quality threshold, a business request for improving the network quality may be generated and then transmitted to the business server.

After receiving the business request, the business server may transmit the business request to the slice controller. The slice controller may determine a current network slice (belonging to the above mobile network) accessed by the terminal and acquire second network slice information respectively corresponding to at least one subscribed network slice. The subscribed network slice is a network slice allowing access of the terminal.

In some embodiments, each user information has at least one subscribed network slice. The subscribed network slice may be a user subscribing to the operator through the business server, or the user subscribing directly to the operator. In practical applications, the adjustment may be performed according to practical requirements. This is not limited herein.

Further, after receiving the business request transmitted by the terminal, the business server in the network slice management system may transmit relevant information in the business request to the slice controller through sub-interface 1 in data interface 1, and also initiate a network acceleration request to the slice controller through sub-interface 2 in data interface 1. The relevant information in the business request includes but is not limited to: user information, user priority, business information, business priority, and position information. The user information, the user priority, the business information, the business priority, and the position information may be specifically referred to the above detailed description, and will not be described in detail herein.

In some embodiments, the operation of determining a current network slice accessed by the terminal and acquiring second network slice information respectively corresponding to at least one subscribed network slice includes:

acquiring relevant information from the business request; and determining a current network slice corresponding to the business request and a corresponding subscribed network slice based on at least one of user information, business information and position information in the relevant information, and acquiring second network slice information respectively corresponding to the respective subscribed network slices.

Specifically, the slice controller may firstly determine a current network slice accessed by the terminal and a corresponding subscribed slice based on at least one of the user information, the business information and the position information in the relevant information, acquire second network slice information respectively corresponding to the respective subscribed network slices from the operator capability open platform through sub-interface 1 and sub-interface 2 of data interface 4, and then return the respective second network slice information to the slice controller.

S202. Determine whether there is a detection result of target second network slice information satisfying an access condition in the respective second network slice information, and control the current network slice based on the detection result.

After acquiring the respective second network slice information, the slice controller may detect whether there is target second network slice information satisfying an access condition in the respective second network slice information so as to obtain a detection result, and control the current network slice based on the detection result.

Further, after acquiring the respective second network slice information, the slice controller may determine whether there is a target subscribed network slice satisfying the access condition in the respective subscribed network slices based on the respective second network slice information. The access condition includes at least one of the following: a network slice is currently in a normal state and a current slice resource usage amount of the network slice does not exceed a usage amount threshold; a network slice is currently in a normal state and a current slice resource remaining amount of the network slice exceeds a remaining amount threshold; and a network slice is currently in a normal state and a current terminal access amount of the network slice does not exceed an access amount threshold.

If there is at least one target subscribed network slice, slice information of any of the target subscribed network slices may be transmitted to the operator capability open platform through data interface 3, whereby the operator capability open platform switches the terminal from the current network slice to the target subscribed network slice based on the slice information.

Certainly, a current target subscribed network slice with the least slice resource used, and/or with the most slice resource remaining, and/or with the least terminal access may also be selected from at least one target subscribed network slice. Alternatively, other selection manners are also applicable to some embodiments and may be set according to actual requirements in practical applications. This is not limited herein.

Figure 3:
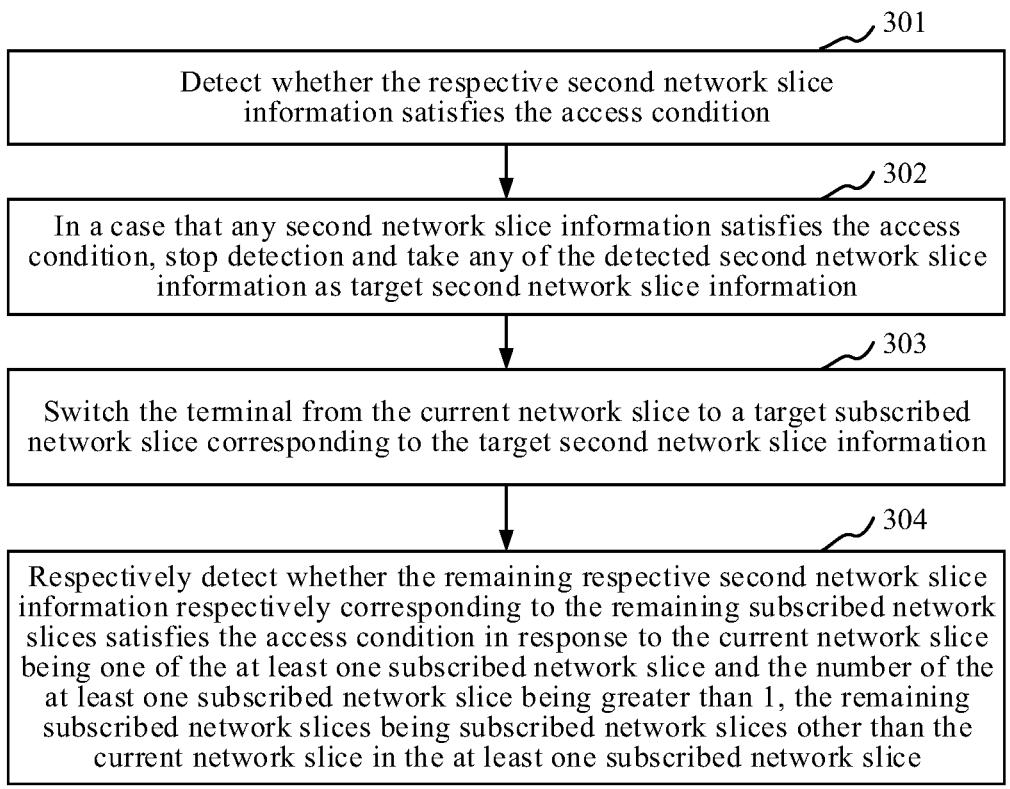
FIG. 3 is a schematic flowchart of operation S202 in FIG. 1.

In some embodiments, as shown in FIG. 3, the operation of determining whether there is a detection result of target second network slice information satisfying an access condition in the respective second network slice information and controlling the current network slice based on the detection result includes the following operations:

S301. Detect whether the respective second network slice information satisfies the access condition.

S302. In a case that any second network slice information satisfies the access condition, stop detection and take any of the detected second network slice information as target second network slice information.

S303. Switch the terminal from the current network slice to a target subscribed network slice corresponding to the target second network slice information.

In some embodiments, a default network slice accessed when a terminal accesses a mobile network may or may not be a subscribed network slice corresponding to the terminal. Therefore, the slice controller may determine whether the current network slice accessed by the terminal is one of the at least one subscribed network slice based on the respective second network slice information.

If no, it may be detected whether the respective second network slice information satisfies the access condition respectively. When it is detected that any second network slice information satisfies the access condition, the detection may be stopped, and the subscribed network slice corresponding to any of the second network slice information is taken as a target subscribed network slice to be accessed by the terminal, so as to obtain a target subscribed network slice.

S304. Respectively detect whether the remaining respective second network slice information respectively corresponding to the remaining subscribed network slices satisfies the access condition based on the current network slice being one of the at least one subscribed network slice and the number of the at least one subscribed network slice being greater than 1. The remaining subscribed network slices are subscribed network slices other than the current network slice in the at least one subscribed network slice.

Specifically, since each user corresponds to at least one subscribed network slice and one network slice is allocated when the terminal accesses the mobile network, there may be a case where a certain user corresponds to only one subscribed network slice and a subscribed network slice is allocated when the terminal accesses. In this case, the terminal cannot be switched to other network slices.

Therefore, in some embodiments, if the current network slice accessed by the terminal is any of the at least one subscribed network slice and the number of the at least one subscribed network slice is greater than 1, the slice controller may respectively detect whether the remaining respective second network slice information respectively corresponding to the remaining subscribed network slices satisfies the access condition. The remaining subscribed network slices are subscribed network slices other than the current network slice in the at least one subscribed network slice.

Figure 4:
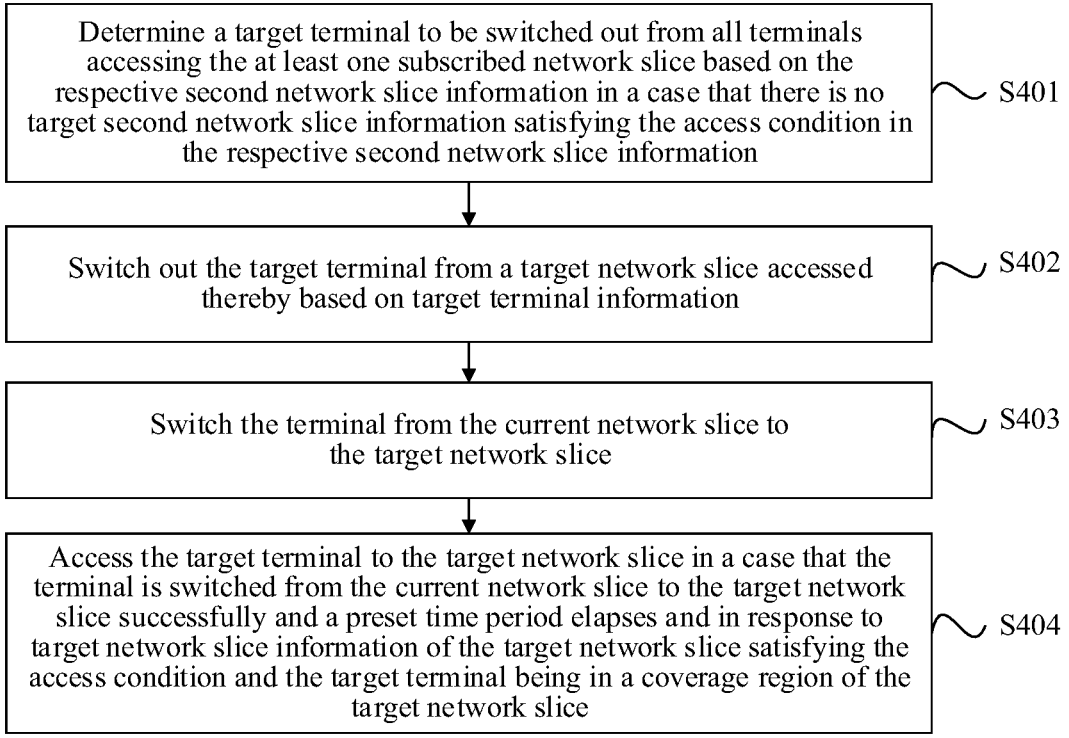
FIG. 4 is a schematic flowchart 2 of operation S202 in FIG. 1.

In some embodiments, as shown in FIG. 4, the operation of determining whether there is a detection result of target second network slice information satisfying an access condition in the respective second network slice information and controlling the current network slice based on the detection result includes the following operations:

S401. Determine a target terminal to be switched out from all terminals accessing the at least one subscribed network slice based on the respective second network slice information in a case that there is no target second network slice information satisfying the access condition in the respective second network slice information.

S402. Switch out the target terminal from a target network slice accessed thereby based on target terminal information of the target terminal. And S403. Switch the terminal from the current network slice to the target network slice.

Specifically, if the target subscribed network slice satisfying the access condition does not exist in all the subscribed network slices, the slice controller determines a target terminal to be switched out from all terminals accessing all the subscribed network slices based on the respective second network slice information.

Specifically, the slice controller may select a low-priority user/business (firstly selecting a low-priority target business and then selecting a low-priority user under the target business) as a candidate user to be switched out from a network slice according to users accessing the current network slice and the respective subscribed network slices and user/business priority. Since the current user also accesses the current network slice, it is possible that the candidate user is the current user.

Therefore, if the candidate user is the current user, the network quality cannot be improved. If the candidate user is not the current user, target terminal information corresponding to the candidate user may be transmitted to the operator capability open platform through data interface 3, whereby the operator capability open platform switches the target terminal out from the target network slice accessed thereby based on the target terminal information, and switches the current network slice accessed by the terminal to the target network slice.

Further, in some embodiments, any user, when subscribing to a subscribed network slice, may preferentially set the subscribed network slice to an exclusive network slice.

When a target terminal corresponding to a certain user is switched out from a target network slice currently accessed thereby, the operator capability open platform will access the target terminal into a shared network slice.

For example, it is assumed that users 1, 2 and 3 are currently accessing network slice 3, network slice 3 is an exclusive network slice, and the business priority and user priority of user 2 are the lowest priorities among four users. Then, when user 4 accesses network slice 3, it is determined that a terminal corresponding to user 2 is a target terminal. At this moment, the target terminal corresponding to user 2 is switched out from network slice 3 and accesses the shared network slice, and then user 4 accesses network slice 3.

S404. Access the target terminal to the target network slice in a case that the terminal is switched from the current network slice to the target network slice successfully and a preset time period elapses and based on target network slice information of the target network slice satisfying the access condition and the target terminal being in a coverage region of the target network slice.

After the target terminal is successfully switched out from the target network slice, the slice controller may record a switch-out flag of the target terminal while setting a timing period at the time of successful switching. When the time period elapses, the slice controller acquires network slice information of the target network slice, detects whether the network slice information satisfies an access condition, and also detects whether the target terminal is still in a coverage region of the target network slice. If the access condition is satisfied and the target terminal is in the coverage region, the target terminal re-accesses the target network slice. If the access condition is not satisfied and/or the target terminal is not in the coverage region, S404 is repeatedly performed.

Figure 5:
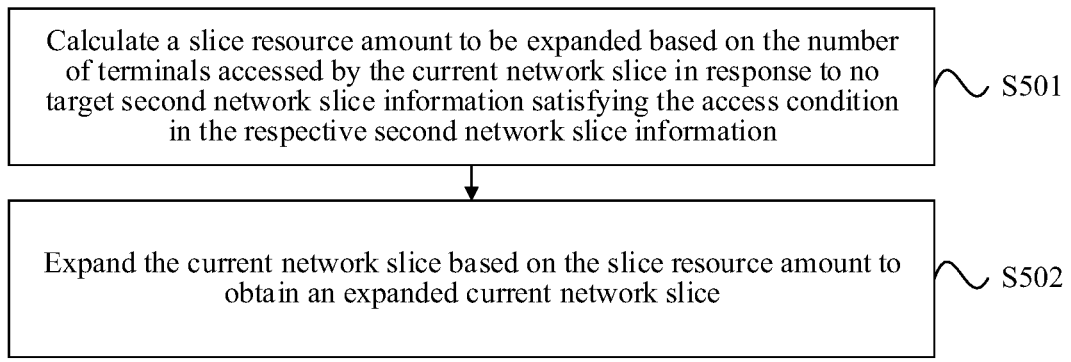
FIG. 5 is a schematic flowchart 3 of operation S202 in FIG. 1.

In some embodiments, as shown in FIG. 5, the operation of determining whether there is a detection result of target second network slice information satisfying an access condition in the respective second network slice information and controlling the current network slice based on the detection result includes the following operations:

S501. Calculate a slice resource amount to be expanded based on the number of terminals accessed by the current network slice based on no target second network slice information satisfying the access condition in the respective second network slice information. And S502. Expand the current network slice based on the slice resource amount to obtain an expanded current network slice.

Specifically, if there is no target second network slice information satisfying the access condition in the respective second network slice information and the slice controller obtains that a count of business requests being triggered under the current network slice within a preset time period exceeds a count threshold, the slice controller acquires user state information and network slice information of the current network slice from the operator capability open platform through sub-interface 1 and sub-interface 2 of data interface 4, calculates a slice resource amount to be expanded based on the user state information and the network slice information, and then transmits the slice resource amount to the operator capability open platform through data interface 2, whereby the operator capability open platform expands the current network slice based on the slice resource amount to obtain an expanded current network slice.

Further, the slice controller may also count cells to which the current network slice belongs, and determine all network slices to be expanded under the cells, so that a plurality of network slices under the same cell may be expanded simultaneously. In practical applications, an object to be expanded may be set according to practical requirements. This is not limited therein.

In some embodiments, a network slice management system determines, based on a business request of a terminal, a current network slice accessed by the terminal, and acquires second network slice information respectively corresponding to at least one subscribed network slice. The subscribed network slice is a network slice allowing access of the terminal. Then, it is determined whether there is a detection result of target second network slice information satisfying an access condition in the respective second network slice information, and the current network slice is controlled based on the detection result. In this way, after acquiring the respective second network slice information, the network slice management system detects the respective second network slice information to obtain whether there is a detection result of target second network slice information satisfying an access condition in the respective second network slice information, and then performs network slice management on the current network slice and at least one subscribed network slice according to the detection result, thereby realizing a network slice management and control method.

Further, the application client in the network slice management system is configured to monitor the terminal and initiate the business request. The business server is configured to provide business services to users and submit/modify/delete business service priorities, user information using the business, user priorities, etc. to the slice controller through the interface provided by the slice controller according to policy information. The slice controller is configured for user/business priority management, slice capacity management and user management, and realizes refined network slice management, user management and control systems and management methods in network slices, and interaction mechanisms with the mobile network by means of three-party cooperation, especially an exclusive network slice management and control system of a user and a network slice/user management mechanism of an exclusive network slice of a user, thereby meeting the personalized requirements of the user and promoting the commercial application of a network slice technology.

Figure 6A:
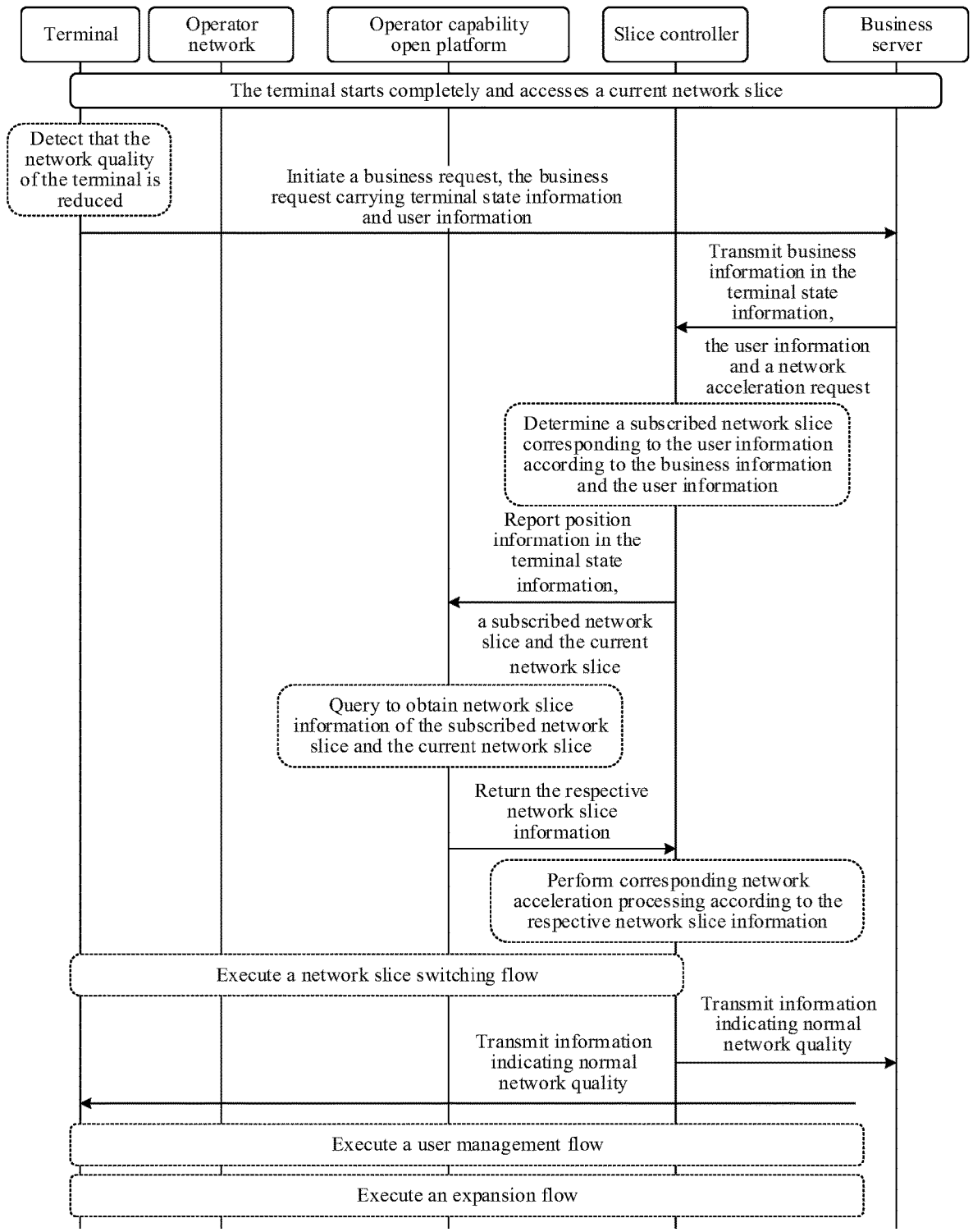
FIG. 6A is a schematic interaction diagram for handling a network quality reduction alarm according to some embodiments.

For the convenience of understanding, referring to FIG. 6A, some embodiments are described in detail with an example of handling a network quality reduction alarm.

The network quality reduction alarm involves five parties: a terminal (installed with an application client), an operator network, an operator capability open platform, a slice controller, and a business server. The operation specifically includes:

101) The current terminal starts completely and accesses a current network slice.

102) The application client detects that the network quality of the current terminal is reduced.

103) The current terminal initiates a business request to the business server through data interface 5, and the business request carries terminal state information and user information.

104) The business server transmits business information in the terminal state information, the user information and a network acceleration request to the slice controller through sub-interface 2 of data interface 1.

105) The slice controller determines a subscribed network slice corresponding to the user information according to the business information and the user information.

106) The slice controller reports position information in the terminal state information, the subscribed network slice and the current network slice to the operator capability open platform through sub-interface 1 of data interface 4, and the operator capability open platform queries to obtain network slice information of the subscribed network slice and the current network slice.

107) The respective network slice information is returned to the slice controller, and the slice controller performs corresponding network acceleration processing according to the respective network slice information.

108a) The slice controller determines that there is a target subscribed network slice which is in a normal state and has remaining slice resources, and a network slice switching flow 108a is executed on the terminal through the operator capability open platform and the operator network to switch the current terminal from the current network slice to the target subscribed network slice.

109) When the execution of the network slice switching flow is completed, the slice controller transmits information indicating normal network quality to the business server.

1010) The business server transmits the information indicating normal network quality to the current terminal.

108b) If there is no target subscribed network slice, a user management flow 108b is executed, a target terminal with a business priority and a user priority in the current network slice is determined, and the target terminal is switched out from the current network slice so that the current terminal may access the current network slice, and meanwhile, the target terminal accesses a shared network slice.

108c) The slice controller determines whether to expand the current network slice by calculating whether a count of network quality reduction alarms being triggered under the current network slice exceeds an alarm count threshold within a preset time period, and if yes, an expansion flow 108c is executed.

Figure 6B:
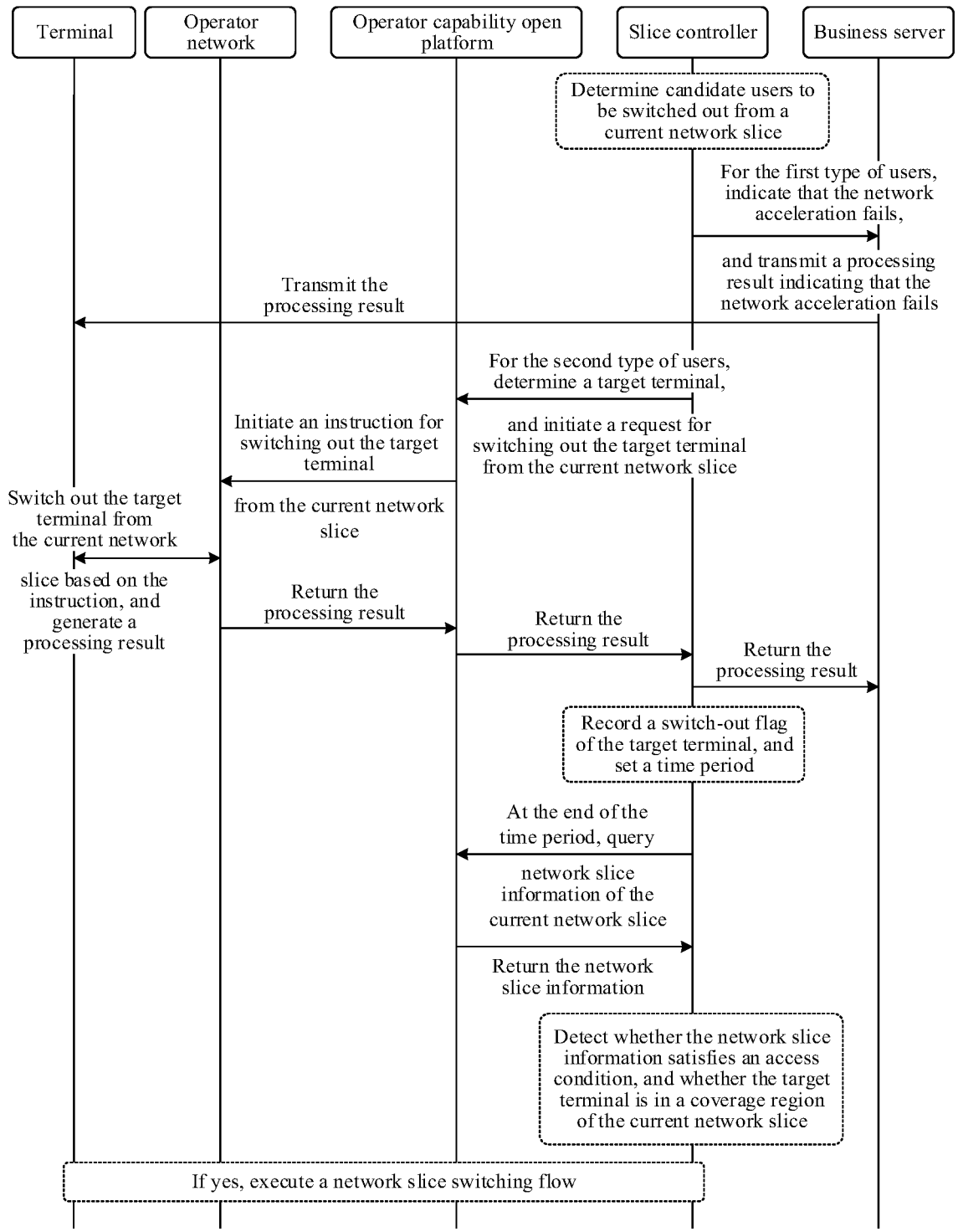
FIG. 6B is a schematic interaction diagram of a user management flow 108b in FIG. 6A.

Further, referring to FIG. 6B, the user management flow 108b is described in detail.

201) The slice controller determines users with the lowest business priority and user priority as candidate users to be switched out from the current network slice according to users accessing the current network slice and user/business priority, and the candidate users include two types: a first type: users initiating a network quality reduction alarm, i.e. the users initiating the network quality reduction alarm are the users with the lowest business priority and user priority; a second type: other users accessing the current network slice.

202a) For the first type of users, the slice controller determines that the network acceleration fails, and transmits a processing result indicating the network acceleration failure to the business server.

203a) The business server transmits the processing result to the current terminal.

202b) For the second type of users, the terminal corresponding to the candidate users is determined as a target terminal, and the slice controller initiates a request for switching out the target terminal from the current network slice to the operator capability open platform through data interface 3.

203b) The operator capability open platform initiates an instruction for switching out the target terminal from the current network slice to the operator network.

204) The operator network switches out the target terminal from the current network slice based on the instruction, and generates a processing result.

205-207) The operator network returns the processing result to the operator capability open platform. The operator network returns the processing result to the slice controller. The slice controller returns the processing result to the business server.

208) The slice controller records a switch-out flag of the target terminal while setting a timing period.

209) At the end of the time period, the slice controller queries network slice information of the current network slice from the operator capability open platform through data interface 4.

2010) The operator capability open platform returns the network slice information, and the slice controller detects whether the network slice information satisfies an access condition, and also detects whether the target terminal is still in a coverage region of the current network slice.

2011) If yes, the slice controller executes a network slice switching flow 108*a* to switch the current terminal from a shared network slice to the current network slice.

Figure 6C:
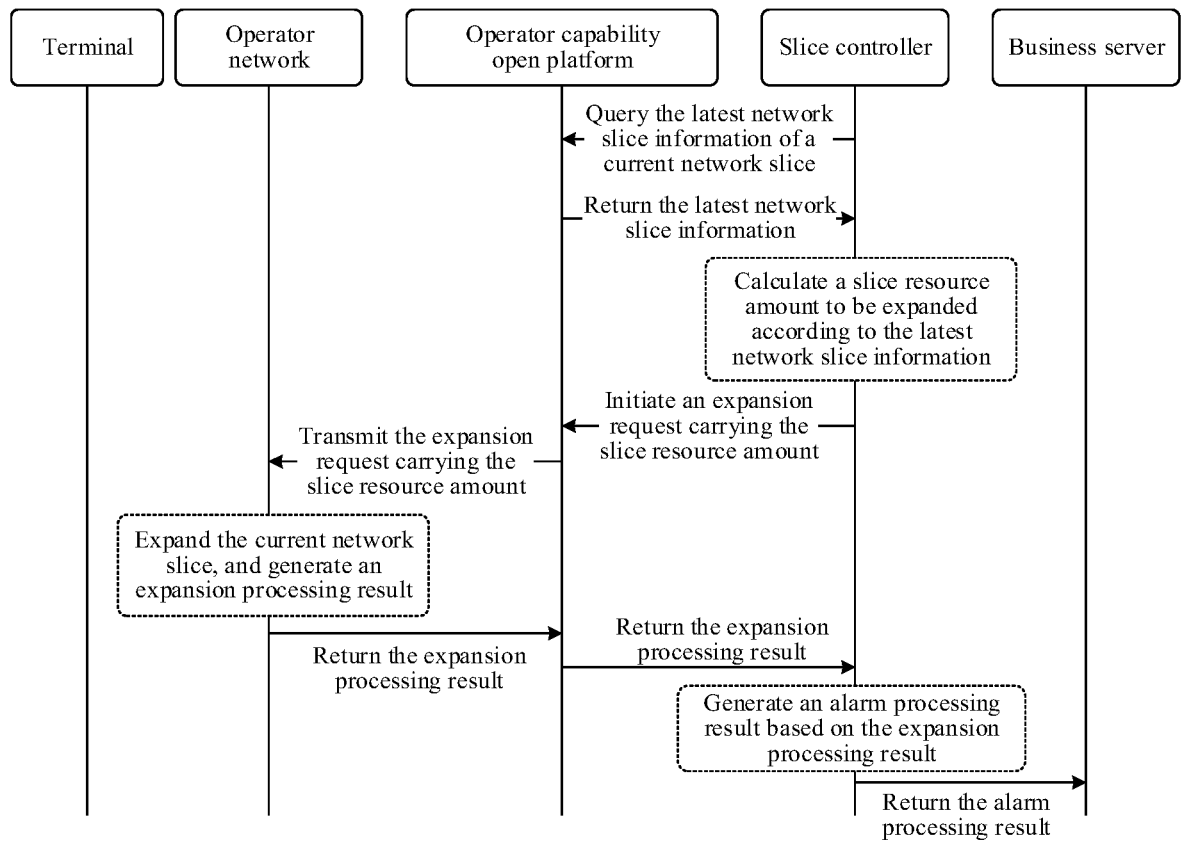
FIG. 6C is a schematic interaction diagram of an expansion flow 108c in FIG. 6A.

Further, referring to FIG. 6C, the expansion flow 108*c* is described in detail.

301) If the slice controller determines that expansion is required, the slice controller queries the latest network slice information of the current network slice from the operator capability open platform through sub-interface 1 and sub-interface 2 of data interface 4.

302) The operator capability open platform returns the latest network slice information.

303) The slice controller calculates a slice resource amount to be expanded according to the latest network slice information.

304) The slice controller initiates an expansion request carrying the slice resource amount to the operator capability open platform through data interface 2.

305) The operator capability open platform transmits the expansion request carrying the slice resource amount to the operator network.

306) The operator network performs expansion on the current network slice, generates an expansion processing result after the expansion is completed, and returns the expansion processing result to the operator capability open platform.

307) The operator capability open platform returns the expansion processing result to the slice controller. And 308) The slice controller generates an alarm processing result based on the expansion processing result and returns the alarm processing result to the business server.

Some embodiments provide a schematic structural diagram of a network slice management system. The system of some embodiments may include:

a business server, configured to acquire a business request of a terminal and transmit the business request of the terminal to a slice controller; and the slice controller, configured to determine, based on the business request of the terminal, a current network slice accessed by the terminal, and acquire second network slice information respectively corresponding to at least one subscribed network slice, the subscribed network slice being a network slice allowing access of the terminal; and determine whether there is a detection result of target second network slice information satisfying an access condition in the respective second network slice information, and control the current network slice based on the detection result.

In some embodiments, the slice controller is further configured to:

detect whether the respective second network slice information satisfies the access condition;

in a case that any second network slice information satisfies the access condition, stop detection and take any of the detected second network slice information as target second network slice information; and switch the terminal from the current network slice to a target subscribed network slice corresponding to the target second network slice information.

In some embodiments, the slice controller is further configured to:

respectively detect whether the remaining respective second network slice information respectively corresponding to the remaining subscribed network slices satisfies the access condition based on the current network slice being one of the at least one subscribed network slice and the number of the at least one subscribed network slice being greater than 1, the remaining subscribed network slices being subscribed network slices other than the current network slice in the at least one subscribed network slice.

In some embodiments, the slice controller is further configured to:

determine a target terminal to be switched out from all terminals accessing the at least one subscribed network slice based on the respective second network slice information in a case that there is no target second network slice information satisfying the access condition in the respective second network slice information;

switch out the target terminal from a target network slice accessed thereby based on target terminal information of the target terminal; and switch the terminal from the current network slice to the target network slice.

In some embodiments, the slice controller is further configured to:

access the target terminal to the target network slice in a case that the terminal is switched from the current network slice to the target network slice successfully and a preset time period elapses and based on target network slice information of the target network slice satisfying the access condition and the target terminal being in a coverage region of the target network slice.

In some embodiments, the slice controller is further configured to:

calculate a slice resource amount to be expanded based on the number of terminals accessed by the current network slice based on no target second network slice information satisfying the access condition in the respective second network slice information; and expand the current network slice based on the slice resource amount to obtain an expanded current network slice.

In some embodiments, the slice controller is further configured to:

acquire relevant information from the business request; and determine a current network slice corresponding to the business request and a corresponding subscribed network slice based on at least one of user information, business information and position information in the relevant information, and acquire second network slice information respectively corresponding to the respective subscribed network slices.

In some embodiments, the access condition includes at least one of the following:

a network slice is currently in a normal state and a current slice resource usage amount of the network slice does not exceed a usage amount threshold;

a network slice is currently in a normal state and a current slice resource remaining amount of the network slice exceeds a remaining amount threshold; and a network slice is currently in a normal state and a current terminal access amount of the network slice does not exceed an access amount threshold.

The network slice management system may perform the business request processing method shown in some embodiments, and the implementation principles thereof are similar.

In some embodiments, a network slice management system determines, based on a business request of a terminal, a current network slice accessed by the terminal, and acquires second network slice information respectively corresponding to at least one subscribed network slice. The subscribed network slice is a network slice allowing access of the terminal. Then, it is determined whether there is a detection result of target second network slice information satisfying an access condition in the respective second network slice information, and the current network slice is controlled based on the detection result. In this way, after acquiring the respective second network slice information, the network slice management system detects the respective second network slice information to obtain whether there is a detection result of target second network slice information satisfying an access condition in the respective second network slice information, and then performs network slice management on the current network slice and at least one subscribed network slice according to the detection result, thereby realizing a network slice management and control method.

Further, the application client in the network slice management system is configured to monitor the terminal and initiate the business request. The business server is configured to provide business services to users and submit/modify/delete business service priorities, user information using the business, user priorities, etc. to the slice controller through the interface provided by the slice controller according to policy information. The slice controller is configured for user/business priority management, slice capacity management and user management, and realizes refined network slice management, user management and control systems and management methods in network slices, and interaction mechanisms with the mobile network by means of three-party cooperation, especially an exclusive network slice management and control system of a user and a network slice/user management mechanism of an exclusive network slice of a user, thereby meeting the personalized requirements of the user and promoting the commercial application of a network slice technology.

Some embodiments provide an electronic device, including: a memory and a processor; at least one program, stored in the memory for being executed by the processor to achieve, compared with a conventional technology: In some embodiments, a network slice management system determines, based on a business request of a terminal, a current network slice accessed by the terminal, and acquires second network slice information respectively corresponding to at least one subscribed network slice. The subscribed network slice is a network slice allowing access of the terminal. Then, it is determined whether there is a detection result of target second network slice information satisfying an access condition in the respective second network slice information, and the current network slice is controlled based on the detection result. In this way, after acquiring the respective second network slice information, the network slice management system detects the respective second network slice information to obtain whether there is a detection result of target second network slice information satisfying an access condition in the respective second network slice information, and then performs network slice management on the current network slice and at least one subscribed network slice according to the detection result, thereby realizing a network slice management and control method.

Figure 7:
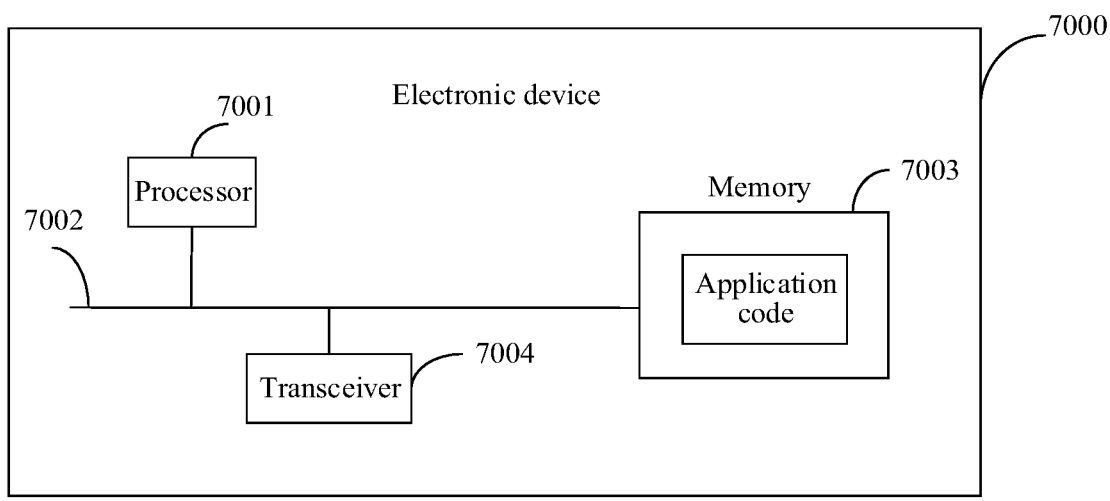
FIG. 7 is a schematic structural diagram of an electronic device for business request processing according to some embodiments.

In some embodiments, an electronic device is provided. As shown in FIG. 7, an electronic device 7000 shown in FIG. 7 includes a processor 7001 and a memory 7003. The processor 7001 and the memory 7003 are connected, for example, are connected by a bus 7002. The electronic device 7000 may further include a transceiver 7004. It is to be noted that During actual application, there may be one or more transceivers 7004. The structure of the electronic device 7000 does not constitute a limitation on the embodiments.

The processor 7001 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or perform various examples of logic blocks, modules, and circuits described with reference to content disclosed in this application. The processor 7001 may also be a combination that implements computing functions, for example, including a combination of one or more microprocessors or a combination of a DSP and a microprocessor.

The bus 7002 may include a channel, to transmit information between the foregoing components. The bus 7002 may be a PCI bus, an EISA bus, or the like. The bus 7002 may be classified into an address bus, a data bus, a control bus, and the like. For ease of description, the bus in FIG. 7 is represented by using only one bold line, but which does not indicate that there is only one bus or one type of bus.

The memory 7003 may be a read-only memory (ROM) or another type of static storage device that can store static information and a static instruction; or a random access memory (RAM) or another type of dynamic storage device that can store information and an instruction; or may be an electrically erasable programmable read-only memory (EEPROM), a CD-ROM or another compact-disc storage medium, optical disc storage medium (including a compact disc, a laser disk, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto.

The memory 7003 is configured to store application program code, and the application program code is executed under control of the processor 7001. The processor 7001 is configured to execute the application program code stored in the memory 7003 to implement the content shown in any one of the foregoing method embodiments.

The electronic device includes but is not limited to: mobile terminals such as a mobile phone, a notebook computer, a digital broadcast receiver, a personal digital assistant (PDA), a portable Android device (PAD), a portable multimedia player (PMP), an in-vehicle terminal (such as an in-vehicle navigation terminal) and fixed terminals such as a digital television (TV) and a desktop computer.

According to some embodiments, a computer-readable storage medium is provided, storing a computer program, the computer program, when run on a computer, causing the computer to perform corresponding content in the foregoing method embodiments. Compared with the related art, in some embodiments, a network slice management system determines, based on a business request of a terminal, a current network slice accessed by the terminal, and acquires second network slice information respectively corresponding to at least one subscribed network slice. The subscribed network slice is a network slice allowing access of the terminal. Then, it is determined whether there is a detection result of target second network slice information satisfying an access condition in the respective second network slice information, and the current network slice is controlled based on the detection result. In this way, after acquiring the respective second network slice information, the network slice management system detects the respective second network slice information to obtain whether there is a detection result of target second network slice information satisfying an access condition in the respective second network slice information, and then performs network slice management on the current network slice and at least one subscribed network slice according to the detection result, thereby realizing a network slice management and control method.

Although the operations in the flowchart in the accompanying drawings are sequentially shown according to indication of an arrow, the operations are not necessarily sequentially performed according to a sequence indicated by the arrow. Unless explicitly specified in this specification, execution of the operations is not strictly limited in the sequence, and the operations may be performed in other sequences. In addition, at least some operations in the flowcharts in the accompanying drawings may include a plurality of sub operations or a plurality of stages. The sub operations or the stages are not necessarily performed at the same moment, but may be performed at different moments. The sub operations or the stages are not necessarily performed in sequence, but may be performed in turn or alternately with another operation or at least some of sub operations or stages of the another operation.

What is claimed is:

1. A request processing method, performed by an electronic device, the request processing method comprising:
   based on a request received from a terminal, determining a current network slice accessed by the terminal, and acquiring, from a network slice controller based on information included in the request, second network slice information respectively corresponding to at least one subscribed network slice, the subscribed network slice being a network slice allowing access of the terminal;
   determining whether there is a detection result of target second network slice information satisfying an access condition in the respective second network slice information; and
   controlling the current network slice based on the detection result.

2. The request processing method according to claim 1, wherein the determining whether there is a detection result of target second network slice information satisfying an access condition in the respective second network slice information and controlling the current network slice based on the detection result comprises:
   detecting whether the respective second network slice information satisfies the access condition;
   in a case that any second network slice information satisfies the access condition, stopping detection and taking any of the detected second network slice information as target second network slice information; and
   switching the terminal from the current network slice to a target subscribed network slice corresponding to the target second network slice information.

3. The request processing method according to claim 2, wherein the detecting whether the respective second network slice information satisfies the access condition comprises:
   respectively detecting whether the remaining respective second network slice information respectively corresponding to the remaining subscribed network slices satisfies the access condition based on the current network slice being one of the at least one subscribed network slice and the number of the at least one subscribed network slice being greater than 1, the remaining subscribed network slices being subscribed network slices other than the current network slice in the at least one subscribed network slice.

4. The request processing method according to claim 1, wherein the determining whether there is a detection result of target second network slice information satisfying an access condition in the respective second network slice information and controlling the current network slice based on the detection result comprises:
   determining a target terminal to be switched out from all terminals accessing the at least one subscribed network slice based on the respective second network slice information in a case that there is no target second network slice information satisfying the access condition in the respective second network slice information;
   switching out the target terminal from a target network slice accessed thereby based on target terminal information of the target terminal; and
   switching the terminal from the current network slice to the target network slice.

5. The request processing method according to claim 4, further comprising:
   accessing the target terminal to the target network slice in a case that the terminal is switched from the current network slice to the target network slice successfully and a preset time period elapses and based on target network slice information of the target network slice satisfying the access condition and the target terminal being in a coverage region of the target network slice.

6. The request processing method according to claim 1, wherein the determining whether there is a detection result of target second network slice information satisfying an access condition in the respective second network slice information and controlling the current network slice based on the detection result comprises:
   calculating a slice resource amount to be expanded based on the number of terminals accessed by the current network slice based on no target second network slice information satisfying the access condition in the respective second network slice information; and
   expanding the current network slice based on the slice resource amount to obtain an expanded current network slice.

7. The request processing method according to claim 1, wherein the determining a current network slice accessed by the terminal and acquiring second network slice information respectively corresponding to at least one subscribed network slice comprises:
   acquiring relevant information from the request; and
   determining a current network slice corresponding to the request and a corresponding subscribed network slice based on at least one of user information, information and position information in the relevant information, and acquiring second network slice information respectively corresponding to the respective subscribed network slices.

8. The request processing method according to claim 1, wherein the access condition comprises at least one of the following:
a network slice is currently in a normal state and a current slice resource usage amount of the network slice does not exceed a usage amount threshold;
a network slice is currently in a normal state and a current slice resource remaining amount of the network slice exceeds a remaining amount threshold; and
a network slice is currently in a normal state and a current terminal access amount of the network slice does not exceed an access amount threshold.

9. A request processing system, comprising:
a server, configured to acquire a request of a terminal; and
a slice controller configured to receive the request of the terminal from the server;
the server comprising:
at least one memory configured to store program code; and
at least one processor configured to read the program code and operate as instructed by the program code to
based on the request of the terminal, determine a current network slice accessed by the terminal, and acquire, from the slice controller based on information included in the request, second network slice information respectively corresponding to at least one subscribed network slice, the subscribed network slice being a network slice allowing access of the terminal,
determine whether there is a detection result of target second network slice information satisfying an access condition in the respective second network slice information, and
control the current network slice based on the detection result.

10. The request processing system according to claim 9, wherein the at least one processor is further configured to detect whether the respective second network slice information satisfies the access condition; and in a case that any second network slice information satisfies the access condition, stop detection and take any of the detected second network slice information as target second network slice information; switch the terminal from the current network slice to a target subscribed network slice corresponding to the target second network slice information.

11. The request processing system according to claim 10, wherein the at least one processor is further configured to respectively detect whether the remaining respective second network slice information respectively corresponding to the remaining subscribed network slices satisfies the access condition based on the current network slice being one of the at least one subscribed network slice and the number of the at least one subscribed network slice being greater than 1, the remaining subscribed network slices being subscribed network slices other than the current network slice in the at least one subscribed network slice.

12. The request processing system according to claim 9, wherein the at least one processor is further configured to determine a target terminal to be switched out from all terminals accessing the at least one subscribed network slice based on the respective second network slice information in a case that there is no target second network slice information satisfying the access condition in the respective second network slice information; switch out the target terminal from a target network slice accessed thereby based on target terminal information of the target terminal; and switch the terminal from the current network slice to the target network slice.

13. The request processing system according to claim 12, wherein the at least one processor is further configured to access the target terminal to the target network slice in a case that the terminal is switched from the current network slice to the target network slice successfully and a preset time period elapses and based on target network slice information of the target network slice satisfying the access condition and the target terminal being in a coverage region of the target network slice.

14. The request processing system according to claim 9, wherein the at least one processor is further configured to calculate a slice resource amount to be expanded based on the number of terminals accessed by the current network slice based on no target second network slice information satisfying the access condition in the respective second network slice information; and expand the current network slice based on the slice resource amount to obtain an expanded current network slice.

15. The request processing system according to claim 9, wherein the at least one processor is further configured to
acquire relevant information from the request; and
determine a current network slice corresponding to the request and a corresponding subscribed network slice based on at least one of user information, information and position information in the relevant information, and acquire second network slice information respectively corresponding to the respective subscribed network slices.

16. The request processing system according to claim 9, wherein the access condition comprises at least one of the following: a network slice is currently in a normal state and a current slice resource usage amount of the network slice does not exceed a usage amount threshold; a network slice is currently in a normal state and a current slice resource remaining amount of the network slice exceeds a remaining amount threshold; and a network slice is currently in a normal state and a current terminal access amount of the network slice does not exceed an access amount threshold.

17. A non-transitory computer-readable storage medium, storing computer code that when executed by at least one processor causes the at least one processor to:
based on a request received from a terminal, determine a current network slice accessed by the terminal, and acquire, from a network slice controller based on information included in the request, second network slice information respectively corresponding to at least one subscribed network slice, the subscribed network slice being a network slice allowing access of the terminal;
determine whether there is a detection result of target second network slice information satisfying an access condition in the respective second network slice information; and
control the current network slice based on the detection result.

18. The non-transitory computer-readable storage medium according to claim 17, wherein the determine whether there is a detection result of target second network slice information satisfying an access condition in the respective second network slice information and control the current network slice based on the detection result comprises:

detecting whether the respective second network slice information satisfies the access condition;

in a case that any second network slice information satisfies the access condition, stopping detection and taking any of the detected second network slice information as target second network slice information; and switching the terminal from the current network slice to a target subscribed network slice corresponding to the target second network slice information.

19. The non-transitory computer-readable storage medium according to claim 18, wherein the detecting whether the respective second network slice information satisfies the access condition comprises:

respectively detecting whether the remaining respective second network slice information respectively corresponding to the remaining subscribed network slices satisfies the access condition based on the current network slice being one of the at least one subscribed network slice and the number of the at least one subscribed network slice being greater than 1, the remaining subscribed network slices being subscribed network slices other than the current network slice in the at least one subscribed network slice.

20. The non-transitory computer-readable storage medium according to claim 17, wherein the determine whether there is a detection result of target second network slice information satisfying an access condition in the respective second network slice information and control the current network slice based on the detection result comprises:

determining a target terminal to be switched out from all terminals accessing the at least one subscribed network slice based on the respective second network slice information in a case that there is no target second network slice information satisfying the access condition in the respective second network slice information;

switching out the target terminal from a target network slice accessed thereby based on target terminal information of the target terminal; and switching the terminal from the current network slice to the target network slice.

* * * * *